US012676473B2

(12) United States Patent
Venâncio Amaral et al.

(10) Patent No.: US 12,676,473 B2
(45) Date of Patent: Jul. 7, 2026

(54) DEVICES AND PROCESSES FOR ARC SUPPRESSION IN ELECTRICAL PANELS

(71) Applicants: UNIVERSIDADE FEDERAL DE MINAS GERAIS, Belo Horizonte (BR); PETRÓLEO BRASILEIRO S/A—PETROBRAS, Rio de Janeiro (BR)

(72) Inventors: Fernando Venâncio Amaral, Belo Horizonte (BR); Sidelmo Magalhães Silva, Belo Horizonte (BR); Braz De Jesus Cardoso Filho, Belo Horizonte (BR); Claudio Alvares Conceição, Belo Horizonte (BR); Gustavo Fontoura Guimarães, Belo Horizonte (BR)

(73) Assignees: UNIVERSIDADE FEDERAL DE MINAS GERAIS, Belo Horizonte (BR); PETRÓLEO BRASILEIRO S/A—PETROBRAS, Rio de Janeiro (BR)

( * ) Notice: Subject to any disclaimer, the term of this patent is extended or adjusted under 35 U.S.C. 154(b) by 292 days.

(21) Appl. No.: 18/481,485

(22) Filed: Oct. 5, 2023

(65) Prior Publication Data

US 2024/0128740 A1 Apr. 18, 2024

(30) Foreign Application Priority Data

Oct. 7, 2022 (BR) ...................... 10 2022 020399 7

(51) Int. Cl.
*H02H 7/22* (2006.01)
*H02H 1/00* (2006.01)

(52) U.S. Cl.
CPC ............ *H02H 7/22* (2013.01); *H02H 1/0015* (2013.01); *H02H 1/0092* (2013.01)

(58) Field of Classification Search
CPC ....... H02H 7/22; H02H 1/0015; H02H 1/0092
See application file for complete search history.

(56) References Cited

U.S. PATENT DOCUMENTS

| | | | | | |
|---|---|---|---|---|---|
| 2,868,940 | A | * | 1/1959 | Jennings | .................. H05B 6/50 |
| | | | | | 331/62 |
| 7,408,750 | B2 | * | 8/2008 | Pellon | .................. H02H 1/0015 |
| | | | | | 361/42 |

(Continued)

OTHER PUBLICATIONS

F. Amaral et al., "Design Considerations for a Reliable Power Electronics-based Arc-Flash Suppressor," 2021 IEEE Industry Applications Society Annual Meeting (IAS), Vancouver, BC, Canada, 2021, pp. 1-10, doi: 10.1109/IAS48185.2021.9677219.

*Primary Examiner* — Gertrude Arthur Jeanglaude
(74) *Attorney, Agent, or Firm* — Knobbe, Martens, Olson & Bear LLP

(57) ABSTRACT

It addresses to a process and device capable of mitigating electric arc faults in electrical panels as quickly as a few milliseconds. The technology uses power thyristors that, after detecting the arc, make the electrical connection of the panel's input bus to ground potential in a controlled manner, diverting the arc currents to this preferred path and forcing their extinction. The proposed suppressor device has improved features, as it includes a "snubber" that forms with the current limiting impedance with inductive reactive component a resonant circuit of Resistance, Inductance (L) and Capacitance (RLC). The "snubber" is capable of mitigating adverse consequences of the RLC circuit voltage transient due to the thyristor shutdown, protecting the same against voltage rises and spurious triggers and limiting the voltage on the panel bus to values below those capable of sustaining the arc fault. The technology relates to equipment for industrial and commercial electrical systems, specifically load distribution centers (LDC) or motor control centers (Continued)

(MCC), which can be configured as a compartment within a
LDC or MCC.

8 Claims, 1 Drawing Sheet

(56)                 References Cited

U.S. PATENT DOCUMENTS 7,514,936 B2 *   4/2009  Anwar  ............... G01R 31/1254
                                                            324/536
8,581,147 B2 *  11/2013  Kooken  .............. H02M 1/4225
                                                            219/130.21

* cited by examiner

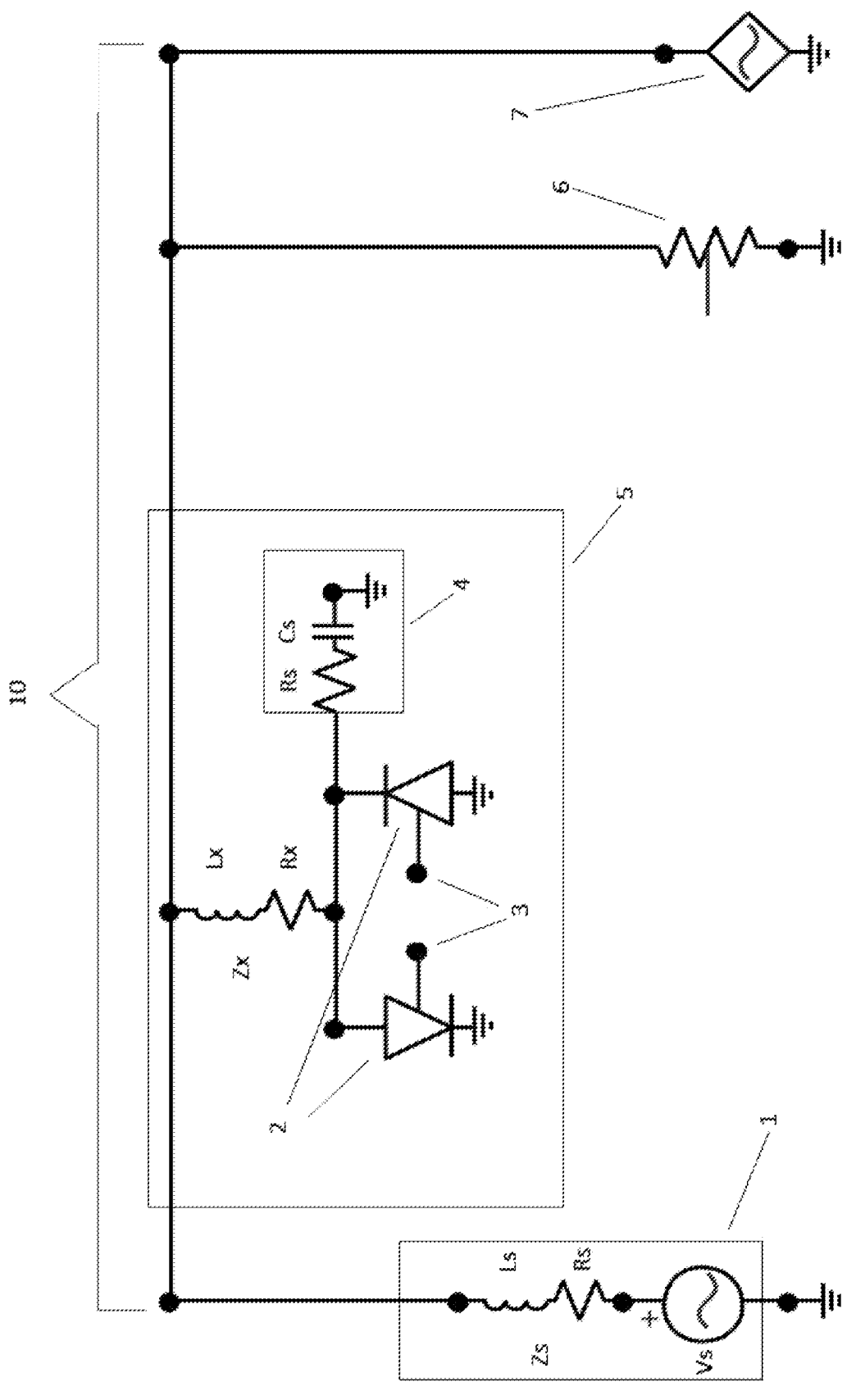

DEVICES AND PROCESSES FOR ARC SUPPRESSION IN ELECTRICAL PANELS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of Brazilian Application No. 10 2022 020399 7, filed Oct. 7, 2022, the entire contents of which are hereby incorporated by reference.

The present application is drawn to processes and devices capable of mitigating electric arc faults in electrical panels as quickly as a few milliseconds. The technology uses power thyristors that, after detecting the arc, make the electrical connection of the panel's input bus to ground potential in a controlled manner, diverting the arc currents to this preferred path and forcing their extinction. The proposed suppressor device has improved features, as it includes a "snubber" that forms a resonant circuit of Resistance, Inductance (L) and Capacitance (RLC) with the current limiting impedance with inductive reactive component. The "snubber" is capable of mitigating adverse consequences of the RLC circuit voltage transient due to the thyristor shutdown, protecting the same against voltage rises and spurious triggers and limiting the voltage on the panel bus to values below those capable of sustaining the arc fault. The technology relates to equipment for industrial and commercial electrical systems, specifically load distribution centers (LDC) or motor control centers (MCC), which can be configured as a compartment within a LDC or MCC.

When a short circuit occurs with the formation of an electric arc in a distribution panel, there is total or partial loss of the equipment, leading to unscheduled shutdowns of the industrial plant and, often, causing serious accidents to electrical field professionals involved in the maneuvering and maintenance processes of this equipment, including not only burns caused by high radiated thermal energy, but also additional damage caused by projection of materials, metallic vapors arising from the sublimation of copper, toxic gases arising from the burning of internal materials of the panel, among other problems. In addition to the costs of replacing the panel itself and the loss of production during the time this piece of equipment remains unavailable, it is not uncommon for an accident of this nature to lead people to death or permanent disability, with legal and financial consequences for the company and even compromising the image thereof in face of its customers.

There are some technologies in the state of the art based on electronic devices dedicated to mitigating electric arc faults in electrical panels, according to the documents presented below.

Patent application US20210319969A1, titled "Circuit protector arc flash reduction system with parallel connected semiconductor switch", with priority date of May 10, 2018, filed by "Eaton Intelligent Power", presents a circuit for protection containing a pair of antiparallel thyristors that conduct the arc current to a low impedance path connected to a fuse or reduce the arc formation potential if it is about to be triggered. Thyristors are activated when a previously defined voltage threshold is exceeded on the bus of the circuit targeted for protection. In this way, the device, after being activated, acquires permanent damage, and cannot be reused.

The master's thesis titled "Estudo e Projeto de um Sistema Rápido de Supressão de Arco Baseado em Tiristores de Potência" ("Study and Design of a Flash Arc Suppression System Based on Power Thyristors"), with defense on Mar. 27, 2015, proposes the use of thyristors combined with smothering reactors. The reactors contribute to the increase in voltage drop in the suppressor branch, in addition to limiting the current in the thyristors during the time they remain in conduction. According to this proposal, it is necessary for the reactor to have multi-turn winding, support, and high dynamic and thermal efforts. However, due to the high current values reached during the operation of the suppressor, including direct current, this reactor is too bulky and heavy. Furthermore, the costs associated with the acquisition of this component are typically high, since it is a product manufactured to order, that is, it is not part of the catalog of magnetic element suppliers. Finally, the inclusion of reactors in the arc suppressor path hinders the switching of current from the fault to the suppressor branch. This delays the extinction of the arc and increases the incident energy resulting from the fault. (Available at https://ppgee.ufmg.br/defesas/878M.PDF. Last accessed on Nov. 16, 2021.).

The papers titled "A Multi-Sectional Arc Eliminator for Protection of Low Voltage Electrical Equipment" and "The Possibilities to Reduce Arc Flash Exposure with Arc Fault Eliminators", with publication dates Jan. 30, 2020 and Mar. 22, 2021, propose the use of several branches of power thyristors in parallel, wherein these branches have increasing numbers of thyristors in series. Each branch is activated at pre-established time intervals. For branches with more or less thyristors in series, there is more or less voltage drop respectively. This way, it is not necessary to include passive elements (e.g., reactors) for voltage drop adjustment purposes. Furthermore, a trigger circuit is required for each thyristor that is part of the solution, increasing the complexity, cost, volume and weight and also reducing the reliability of this alternative. Further, it should be mentioned that an additional circuit for measuring and calculating the triggering angle is necessary for each branch of thyristors.

The paper titled "Increasing the Ride-Through Fault Capability of a Power Electronics-Based Arc-Flash Suppressor", with publication date of Aug. 15, 2021, uses power thyristors connected in antiparallel to a current limiting impedance. After detecting the arc, the thyristors make, in a controlled manner, the electrical connection of the panel's input bus to the ground potential, diverting the arc currents to this preferential path and forcing their extinction.

In the state of the art, no technologies were found with features similar to the technology proposed in this patent application. The exclusive technical elements of the proposed technology are highlighted: the proposed suppressor has improved features, as it includes a "snubber" that forms, with the current limiting impedance with inductive reactive component, a resonant circuit of Resistance, Inductance (L) and Capacitance (RLC). The "snubber" is capable of mitigating adverse consequences of the RLC circuit voltage transient due to the thyristor shutdown, protecting the same against voltage rises and spurious triggers and limiting the voltage on the panel bus to values below those capable of sustain the arc fault. The design of a "snubber" capable of performing the three mentioned functions is an original proposition and represents an advance on the technological frontier.

BRIEF DESCRIPTION OF THE FIGURES

FIG. 1 depicts a single-phase single-line diagram that represents an example circuit, not limiting the technology, protected by an electronic arc suppressor (5). The circuit in the diagram is formed by: a phase of a generic three-phase electrical system (1) as a voltage source Vs, an impedance Zs of the electrical system (1) consisting of an inductance Ls and a resistance Rs; a representation (6) of a phase-to-ground type arc fault modeled in the circuit, in a non-limiting way, as a controllable resistor; a load (7) connected by bus (10) to the system (1), which can be an induction motor or a generator; an electronic arc suppressor (5) connected to the bus (10) and formed by a current limiting impedance (Zx) consisting of an inductance Lx and a resistance Rx, connected to a pair of thyristors (2) in antiparallel connection whose "gate" terminals are connected to a control unit (3), and the thyristors (2) are connected to a "snubber" (4) consisting of a capacitor Cs and a resistor Rs.

DETAILED DESCRIPTION

Embodiments described herein relate to a process and device capable of mitigating electric arc faults in electrical panels as quickly as a few milliseconds. The technology uses power thyristors that, after detecting the arc, make the electrical connection of the panel's input bus to ground potential in a controlled manner, diverting the arc currents to this preferred path and forcing their extinction. The proposed suppressor device has improved features, as it includes a "snubber" that forms with the current limiting impedance with inductive reactive component a resonant circuit of Resistance, Inductance (L) and Capacitance (RLC), the "snubber" is capable of mitigating adverse consequences of the RLC circuit voltage transient due to the thyristor shutdown, protecting the same against voltage rises and spurious triggers and limiting the voltage on the panel bus to values below those capable of sustaining the arc fault.

I) Process for Electric Arc Suppression:

The process for suppressing electric arcs comprises the following steps:

a) In the three-phase circuit in which it is desired to suppress electric arcs, identifying the voltage threshold ($V_{threshold}$ or $V_{limiar}$) from which it is possible for an arc fault of the phase-to-ground type to occur on the bus (10) using the Kizilcay model (M. Kizilcay and T. Pniok, "Digital Simulation of Fault Arcs in Power Systems", European Transactions on Electrical Power (ETEP), vol. 1, no. 1, Jan/February 1991, pp. 55-60; M. Kizilcay and K. H. Koch, "Numerical Fault Arc Simulation Based on Power Arc Tests", European Transactions on Electrical Power (ETEP), vol. 4, no. 3, May/June 1994, pp. 177-185; M. Kizilcay and P. La Seta, "Digital Simulation of Fault Arcs in Medium-Voltage Distribution Networks", 15th Power Systems Computation Conference (PSCC), Liege, Belgium, 2005, pp. 1-7);

b) Calculating the impedance Zx of the suppressor (5) using expression (I) from the known values Rc (resistance of the thyristor in conduction mode) and equivalent impedance of the electrical system (1) (Zs);

$$\left| \frac{Z_x + R_c}{Z_s + Z_x + R_c} \right| \cdot V_s < V_{limiar} \tag{I}$$

c) Calculating the rise in voltage in the bus (10) due to the circulation of a current Im demanded by at least one load (7) connected in parallel with the suppressor branch and fed by the electrical system by applying the product [(Zx//Zs)×Im], if the calculated voltage rise provides a voltage on the bus (10) greater than $V_{limiar}$ calculated in step "a", decreasing Zx until the voltage on the bus (10) is lower than $V_{limiar}$;

d) Defining the Xx/Rx relation for the suppressor impedance Zx calculated in step e) Calculating the inductive reactance Xx and resistance Rx associated to the impedance Zx based on the Xx/Rx ratio defined in step "d";

f) Calculating the resistance (Rs) of the "snubber" (4) and the capacitance (Cs) of the capacitor of the "snubber" (4) by applying the classical solution to the second-order linear differential equation obtained from a RLC (Resistance, Inductance and Capacitance) series circuit and its response to the voltage step (E), so that, after the solution in the time domain by means of the inverse Laplace transform, the voltage ($V_{T(t)}$) on the "snubber" (4) is obtained, which is the same voltage on the thyristor (2) and which is transmitted by the inductance Lx to the bus (10) that is subject to the overvoltage that can be generated by the RLC circuit transient that occurs during the shutdown of the thyristors (2), wherein the solution is given by choosing between the expressions (II), (III), (IV) resulting from the inverse transform based on the defined damping factor ($\xi$), and for circuits with underdamped oscillations $0 \leq \xi \leq 1$, expression (II) is used:

$$V_T(t) = E - E \cdot \alpha \cdot e^{-\xi \cdot \omega_0 \cdot t} \tag{II}$$

$$\alpha = \cos(\omega_p \cdot t) + (2 \cdot (1 - M) - 1) \cdot \frac{\xi \cdot \omega_0}{\omega_p} \cdot \sin(\omega_p \cdot t)$$

In expression (II), the relation between the undamped natural frequency ($\omega_o$) and the damped frequency ($\omega_p$) is:

$$\omega_p = \omega_0 \cdot \sqrt{1 - \xi^2}$$

For circuits with damped oscillation $\xi = 1$, the expression (III) is used:

$$V_T(t) = E - E \cdot (1 + (2 \cdot (1 - M) - 1) \cdot \omega_0 \cdot t) \cdot e^{-\omega_0 \cdot t} \tag{III}$$

For circuits with overdamped oscillation $\xi > 1$, the expression (IV) is used:

$$V_T(t) = E - E \cdot \beta \cdot e^{-\xi \cdot \omega_0 \cdot t} \tag{IV}$$

$$\beta = \cosh(\omega_p \cdot t) + (2 \cdot (1 - M) - 1) \cdot \frac{\xi \cdot \omega_0}{\omega_p} \cdot \sinh(\omega_p \cdot t)$$

In expression (IV), the relation between the undamped natural frequency ($\omega_o$) and the damped frequency ($\omega_p$) is:

$$\omega_p = \omega_0 \cdot \sqrt{\xi^2 - 1}$$

The values of M and $\xi$ can be obtained by using the expressions (V) and (VI) below:

$$M = \frac{R_S}{R_S + R_x} \tag{V}$$

$$\xi = \frac{(R_S + R_x)_{(\Omega)}}{2} \cdot \sqrt{\frac{C_{S(F)}}{L_{x(H)}}} \tag{VI}$$

The chosen expression of $V_{T(t)}$ (II, III or IV) must be solved to obtain a value of Cs as large and Rs as small as possible so that the contribution of $V_{T(t)}$ does not increase the bus (10) voltage for values greater than the voltage threshold ($V_{limiar}$) calculated in step "a" and, at the same time, satisfy the threshold conditions for current variation in the ligament ($di/dt_{turn-on}$) supportable by the thyristors (2), wherein the "snubber" (4) assumes a specific complementary function in the suppressor (5) of limiting voltage rise due to transients that can increase the voltage on the bus (10) and trigger or sustain an arc fault, where the "snubber" (4) forms a resonant circuit with the impedance Zx;

g) Defining the peak current threshold Ipk that can circulate in the capacitor Cs by applying the ratio Vs/Rs, wherein Rs is the resistance of the "snubber" (4) calculated in step "f";

h) Choosing the capacitor based on the requirements calculated in steps "f" and "g";

i) Applying to the suppressor (5), in its constituent electrical and electronic elements, the values calculated in steps "a" to "g": Rx, Lx, Cs and Rs;

j) Using an electric arc sensor (8) to command the activation of the suppressor (5) configured in step "i" when the formation of an electric arc is detected, wherein the activation is-intermediated by a control unit (3) with independent electrical power supply, which includes the trigger circuits of the thyristors (2) (PWM, "Pulse Width Modulation" and GD, "Gate Driver") and the auxiliary circuits for measuring voltages and currents of the suppressor and signal conditioning that operate the suppressor (5) as a voltage clamp capable of maintaining the voltage on the bus (10) below the $V_{limiar}$ value until the electric arc formed is completely extinguished.

The process for suppressing electric arcs proposed herein can be adapted to the context of an arc fault of a three-phase short circuit to ground, initially considering the steady-state operation which, according to Fortescue's theorem, has only positive sequence current, which allows the three-phase system to be reduced to a single-phase equivalent to which the formulations of claim 1 can be applied by changing the variables from the phase domain to the symmetric components.

In step "d", the Xx/Rx ratio for the suppressor impedance Zx is preferably equal to 5.

In step "j", the process may command the input circuit breaker to reconnect after the electric arc has extinguished, reestablishing the normal operation of the circuit.

II) Device for Electric Arc Suppression:

The device for suppressing electric arcs, defined by the process for suppressing arcs, includes the suppressor (5) containing a pair of thyristors (2) in antiparallel connection whose "gate" terminals are connected to a control unit (3), the electronic arc suppressor (5) is connected to the bus (10) and has a current limiting impedance (Zx), and the current limiting impedance (Zx) consists of an inductance Lx and a resistance Rx and is connected to a pair of thyristors (2) in antiparallel connection connected to a "snubber" (4) consisting of a capacitor Cs and a resistor Rs, with the suppressor (5) working in conjunction with an independent and uninterruptible power supply, a control unit (3) that includes the trigger circuits of the thyristors (2) (PWM and GD) and the auxiliary voltage and current measurement circuits of the suppressor and signal conditioning, also includes an electric arc sensor (8), the arc sensor relay (9) that commands the activation of the suppressor (5), the independent power supply that supplies energy to the control unit (3), to the electric arc sensor (8) and to the relay of the arc sensor (9), where the "snubber" (4) assumes a specific complementary function in the suppressor (5) of limiting voltage rises due to transients that can increase the voltage on the bus (10) and trigger or sustain a fault arc, the "snubber" (4) forms a resonant circuit with the impedance Zx that mitigates adverse consequences of the voltage transient, protecting the thyristor (2) against voltage rises and spurious triggers and limiting the voltage on the bus (10) below by $V_{limiar}$.

The thyristors (2) can be of the "press pack" type, which have a short circuit failure mode. The capacitor Cs can be made of polypropylene or film. The resistor Rs can be non-inductive, such as those manufactured of film of carbon.

The invention claimed is:

1. A process for suppressing electric arcs, the process comprising:

a) in a three-phase circuit in which it is desired to suppress electric arcs, identifying a voltage threshold ($V_{limiar}$) from which it is possible for a phase-to-ground arc fault to occur on a bus using a Kizilcay model;

b) calculating an impedance Zx of a suppressor using expression (I) from known values Rc and Zs, where RC is a resistance of a thyristor in conduction mode, and Zs is equivalent impedance of an electrical system;

$$\left| \frac{Z_x + R_c}{Z_s + Z_x + R_c} \right| \cdot V_s < V_{limiar} \tag{I}$$

c) calculating a voltage rise on the bus due to circulation of a current (Im) demanded by at least one load connected in parallel with the suppressor and fed by the electrical system by applying a product [(Zx//Zs)×Im], if the calculated voltage rise provides a voltage on the bus greater than $V_{limiar}$ calculated in step (a), decreasing Zx until the voltage on the bus is lower than $V_{limiar}$;

d) defining a Xx/Rx ratio for the impedance (Zx) calculated in step (b);

e) calculating an inductive reactance (Xx) and a resistance (Rx) associated with the impedance Zx based on the Xx/Rx ratio defined in step (d);

f) calculating a resistance (Rs) and a capacitance (Cs) of a snubber (4) by applying a classical solution to a second-order linear differential equation obtained from a RLC (Resistance, Inductance and Capacitance) series circuit and a response of the RLC series circuit to a voltage step (E), so that, after solving in a time domain by means of an inverse Laplace transform, a voltage ($V_{T(t)}$) on the snubber is obtained, which is a same voltage on the thyristor and which is transmitted by an inductance (Lx) to the bus that is subject to an overvoltage that can be generated by an RLC circuit transient that occurs during a shutdown of the thyristor, wherein a solution is given by choosing between expressions (II), (III), (IV) resulting from the inverse Lapace transform based on a defined damping factor ($\xi$), and for circuits with underdamped oscillations $0 \leq \xi \leq 1$, expression (II) is used:

$$V_T(t) = E - E \cdot \left( \cos(\omega_p \cdot t) + (2 \cdot (1 - M) - 1) \cdot \frac{\xi\omega_0}{\omega_p} \cdot \sin(\omega_p \cdot t) \right) \cdot e^{-\xi\omega_0 \cdot t} \quad \text{(II)}$$

in expression (II), the relation between an undamped natural frequency ($\omega_o$) and a damped frequency ($\omega_p$) is:

$$\omega_p = \omega_0 \cdot \sqrt{1 - \xi^2}$$

for circuits with damped oscillation $\xi = 1$, expression (III) is used:

$$V_T(t) = E - E \cdot (1 + (2 \cdot (1 - M) - 1) \cdot \omega_0 \cdot t) \cdot e^{-\omega_0 \cdot t} \quad \text{(III)}$$

for circuits with overdamped oscillation $\xi > 1$, expression (IV) is used:

$$V_T(t) =$$
$$E - E \cdot \left( \cosh(\omega_p \cdot t) + (2 \cdot (1 - M) - 1) \cdot \frac{\xi\omega_0}{\omega_p} \cdot \sinh(\omega_p \cdot t) \right) \cdot e^{-\xi\omega_0 \cdot t} \quad \text{(IV)}$$

in expression (IV), the relation between the undamped natural frequency ($\omega_o$) and the damped frequency ($\omega_p$) is:

$$\omega_p = \omega_0 \cdot \sqrt{\xi^2 - 1}$$

the values of M and $\xi$ can be obtained by using expressions (V) and (VI) below:

$$M = \frac{R_S}{R_S + R_x} \quad \text{(V)}$$

$$\xi = \frac{(R_S + R_x)_{(\Omega)}}{2} \cdot \sqrt{\frac{C_{S(F)}}{L_{x(H)}}} \quad \text{(VI)}$$

a chosen expression of $V_{T(t)}$ (II, III or IV) must be solved to obtain a value of Cs as large and a value of Rs as small as possible so that a contribution of $V_{T(t)}$ does not increase the bus voltage for values greater than the voltage threshold ($V_{limiar}$) calculated in step (a) and, at the same time, satisfy threshold conditions for current variation in a ligament ($di/dt_{turn-on}$) supportable by the thyristor, wherein the snubber assumes a specific complementary function in the suppressor of limiting voltage rise due to transients that can increase the voltage on the bus and trigger or sustain an arc fault, where the snubber forms a resonant circuit with the impedance (Zx);

g) defining a peak current threshold (Ipk) that can circulate in a capacitor of the snubber by applying a ratio Vs/Rs, wherein Rs is the resistance of the snubber calculated in step (f) and wherein Vs is the peak voltage of the snubber;

h) choosing the capacitor of the snubber based on the requirements calculated in steps (f) and (g);

i) Applying to the suppressor, in its constituent electrical and electronic elements, the values calculated in steps "a" to "g": Rx, Lx, Cs and Rs;

j) commanding, using an electric arc sensor activation of the suppressor configured in step (i) when a formation of an electric arc is detected, wherein the activation is intermediated by a control unit with independent electrical power supply, which includes trigger circuits of the thyristor and auxiliary circuits for measuring voltages and currents of the suppressor and signal conditioning that operate the suppressor as a voltage clamp capable of maintaining the voltage on the bus below the $V_{limiar}$ value until the electric arc formed is completely extinguished.

2. The process for suppressing electric arcs according to claim 1, wherein the process is adapted to the context of an arc fault of a three-phase short circuit to ground, initially considering the operation in steady state which, according to Fortescue's theorem, has only positive sequence current, which allows the three-phase system to be reduced to a single-phase equivalent to which the formulations of claim 1 can be applied by changing variables from a phase domain to symmetrical components.

3. The process for suppressing electric arcs according to claim 1, wherein, according to step (d), the relation Xx/Rx for the impedance Zx of the suppressor is equal to 5.

4. The process for suppressing electric arcs according to claim 1, further comprising, according to step (j), commanding reconnection of a input circuit breaker after extinction of the electric arc, thereby reestablishing the normal operation of the circuit.

5. A device for suppressing electric arcs, configured to perform the process of claim 1, the device comprising the suppressor containing a pair of thyristors in antiparallel connection, the gate terminals of the pair of thyristors connected to the control unit, wherein the suppressor is connected to the bus and has the current limiting impedance (Zx) consisting of the inductance (Lx) and the resistance (Rx) and is connected to the pair of thyristors in antiparallel connection connected to the snubber comprising a capacitor and a resistor, wherein the suppressor is configured to operate in conjunction with an independent and uninterruptible power supply, the control unit that includes the trigger circuits of the thyristors and the auxiliary circuits for measuring voltages and currents of the suppressor and signal conditioning, also includes the electric arc sensor, and an arc sensor relay that commands the activation of the suppressor, the independent power supply that supplies energy to the control unit, for the electric arc sensor and the arc sensor relay, where the snubber assumes a specific complementary function in the suppressor of limiting voltage rises due to transients which can increase the voltage on the bus and trigger or sustain an arc fault, the snubber forms a resonant circuit with the impedance (Zx) that mitigates adverse consequences of a voltage transient, protecting the thyristors against voltage rises and spurious triggers and limiting the voltage on the bus below $V_{limiar}$.

6. The device for suppressing electric arcs according to claim 5, wherein the pair of thyristors are press pack type thyristors, which have their short circuit failure mode.

7. The device for suppressing electric arcs according to claim 5, wherein the capacitor is in polypropylene or film.

8. The device for suppressing electric arcs according to claim 5, wherein the resistor is non-inductive and is manufactured from carbon film.

* * * * *